(12) United States Patent
Etin et al.

(10) Patent No.: US 11,479,918 B2
(45) Date of Patent: Oct. 25, 2022

(54) COMPOSITE PVC-FREE SHEET FOR A WALLCOVERING WITH IMPROVED APPLICATION ON THE WALL PROPERTIES

(71) Applicant: JSC VEIKA, Vilnius (LT)

(72) Inventors: Aleksey Etin, Vilnius (LT); Jaroslav Voronovic, Vilnius (LT)

(73) Assignee: JSC Veika, Vilnius (LT)

( * ) Notice: Subject to any disclaimer, the term of this patent is extended or adjusted under 35 U.S.C. 154(b) by 0 days.

(21) Appl. No.: 17/058,656

(22) PCT Filed: May 31, 2018

(86) PCT No.: PCT/IB2018/053871
§ 371 (c)(1),
(2) Date: Nov. 25, 2020

(87) PCT Pub. No.: WO2019/229498
PCT Pub. Date: Dec. 5, 2019

(65) Prior Publication Data
US 2021/0198849 A1    Jul. 1, 2021

(51) Int. Cl.
*D21H 27/20* (2006.01)
*B32B 7/022* (2019.01)
(Continued)

(52) U.S. Cl.
CPC ............ *D21H 27/20* (2013.01); *B32B 5/022* (2013.01); *B32B 5/08* (2013.01); *B32B 5/18* (2013.01); *B32B 5/245* (2013.01); *B32B 7/022* (2019.01); *B32B 27/065* (2013.01); *B32B 27/12* (2013.01); *B32B 27/32* (2013.01); *B32B 2262/02* (2013.01);
(Continued)

(58) Field of Classification Search
CPC ......... B32B 5/18; B32B 5/245; B32B 27/065; B32B 2262/14; B32B 2307/734; B32B 2451/00; B32B 2266/025; D21H 27/20
See application file for complete search history.

(56) References Cited

U.S. PATENT DOCUMENTS

2015/0152604 A1*  6/2015 Ullmann ............... D21H 19/30
                                                    428/425.1
2017/0001411 A1*  1/2017 Etin .......................... C08K 3/26
(Continued)

FOREIGN PATENT DOCUMENTS

EP    0297875 A1    1/1989
EP    2915839 A1    9/2015

OTHER PUBLICATIONS

International Polymer Solutions, Inc., Acrylic, [retrieved on May 20, 2022], Retrieved from the Internet <URL: https://www.ipolymer.com/pdf/Acrylic.pdf>. (Year: 2022).*
(Continued)

*Primary Examiner* — Hai Vo
(74) *Attorney, Agent, or Firm* — AAA Law

(57) ABSTRACT

According to embodiments of the invention a composite sheet for a wallcovering comprises a base layer and a top layer bond to the base layer made of polyolefin compound and further may comprise an additional layer. The base layer, the polyolefin layer and in some embodiments the additional layer are such that it is possible to avoid wet curling of a polyolefin type wallcovering during wet hanging process.

2 Claims, 5 Drawing Sheets

(51) Int. Cl.
*B32B 5/02* (2006.01)
*B32B 5/08* (2006.01)
*B32B 5/18* (2006.01)
*B32B 5/24* (2006.01)
*B32B 27/12* (2006.01)
*B32B 27/32* (2006.01)
*B32B 27/06* (2006.01)

(52) U.S. Cl.
CPC ....... *B32B 2262/04* (2013.01); *B32B 2262/14* (2013.01); *B32B 2266/025* (2013.01); *B32B 2307/734* (2013.01); *B32B 2451/00* (2013.01); *B32B 2607/00* (2013.01)

(56) References Cited

U.S. PATENT DOCUMENTS

| | | | |
|---|---|---|---|
| 2018/0002932 A1* | 1/2018 | Van Giel | C08K 3/26 |
| 2019/0136002 A1* | 5/2019 | Mercier | E04F 15/105 |

OTHER PUBLICATIONS

Matweb Material Property Data, Overview of Material for Acrylic, Cast [retrieved on May 20, 2022], Retrieved from the Internet <URL: https://www.matweb.com/search/datasheet.aspx?bassnum=O1303&ckck=1 >. (Year: 2022).*

* cited by examiner

| Modulus of a polymer used in the additional layer | Wet curl parameter (non-woven 0.5% wet expansion) | Wet curl parameter (non-woven 0.25% wet expansion) |
|---|---|---|
| No polymer | 10 | 6 |
| 2 GPa | 5 | 3 |
| 1.2 GPa | 6 | 3 |
| 1.5 GPa | 6 | 3 |
| 0.5 GPa | 8 | 5 |
| 0.2 GPa | 9 | 6 |

Fig. 4

COMPOSITE PVC-FREE SHEET FOR A WALLCOVERING WITH IMPROVED APPLICATION ON THE WALL PROPERTIES

FIELD OF THE INVENTION

The present invention relates to a composite sheet for production of wallcoverings and in particular a PVC-free laminate composite sheet and a wallcovering comprising such composite sheet.

BACKGROUND OF THE INVENTION

Thin, below 1 mm in overall thickness, wallcoverings are typically composed of two main layers with top layer being a decorative hot-embossed Polyvinyl Chloride (PVC) layer and a bottom layer being paper or non-woven substrate. PVC-free compositions for wallcoverings are becoming increasingly important due to ecological issues of PVC materials. Polyolefin (PO) based wallcoverings are an example of such PVC-free wallcoverings. But polyolefin based wallcoverings are prone to thermal curling during production. In order to minimize or avoid thermal curling wallcoverings having polyolefin based top layer and a non-woven substrate base layer has to have low thermal coefficient mismatch and shrinkage of the top layer as compared to the stable bottom layer during heating/cooling cycles during production. Such wallcoverings are disclosed in EP application No. 14158061.3 wherein the wallcovering comprises a composite sheet comprising a base layer and a foamable decorative layer bond to the base layer. The foamable layer comprises material having an elastic modulus of <0.1 GPa. The base layer comprises non-woven material having an elastic modulus of >1 GPa. Also, the modulus ratio between the top layer modulus and base layer modulus has to be kept 0.05.

Hanging process of wallcoverings comprising a polyolefin top layer includes applying adhesive material between a base layer of a wallcovering and a surface to be covered by it. The glue that is used is mostly water based. When the base layer, comprising cellulose, is wetted, it expands, in particular in cross-machine direction (CD). This leads to change in size of paper by expansion into wet state and shrinking into dry state. Swelling of cellulose fibers thus leads to dimensional changes, also called wet expansion. However, the top layer does not expand and therefore stress that the bottom layer imparts on the top layer causes curling (which will further be mentioned as wet curling). This wet curling results in a complicated hanging process as the wallcovering edges tend to get loose from the wall when hanging takes place.

Materials, in addition to cellulose fibers containing polyester fibers, i.e. non-woven materials, show significantly lower wet expansion, compared to cellulose fibers only material. In case of a PVC wallcovering, various types of non-woven as well as even simple paper with high wet expansion are used. This is because PVC compositions with relatively high modulus can be coated without significant thermal curling. Higher modulus PVC coating significantly stabilizes bottom layer wet expansion and curling is avoided. However, in case of polyolefin materials, in order to avoid thermal curling during manufacturing the top layer comprising only polyolefin, the top layer has to be used with relatively low modulus—i.e. below 0.1 GPa. Thus special properties of the layers are needed in order to avoid wet curling in the polyolefin wallcovering that are disclosed in the current application.

SUMMARY OF THE INVENTION

According to embodiments of the present invention a composite sheet for a wallcovering comprises a base layer and a top layer bond to the base layer. The top layer is made of foamable layer of polyolefin compound. The composite sheet further may comprise an additional layer being applied to the foamable layer. The base layer, the foamable layer and in some embodiments the additional layer are such that it is possible to avoid wet curling of a polyolefin type wallcovering during wet hanging process. Using derived wet curling dependence on various layer parameters and a bi-metallic beam problem known as Timoshenko equation together with developed testing method a polyolefin based wallcovering which is free off the above mentioned problem is obtained.

BRIEF DESCRIPTION OF DRAWINGS

The features of the invention believed to be novel and inventive are set forth with particularity in the appended claims. The invention itself, however may be best understood by reference to the following detailed description of the invention, which describes exemplary embodiments, given in non-restrictive examples, of the invention, taken in conjunction with the accompanying drawings, in which:

FIG. 4 shows comparison table of test results of influence of additional polymeric layer on the wet expansion.

DETAILED DESCRIPTION OF THE INVENTION

In cooperation with attached drawings, the technical contents and detailed description of the present invention are described thereinafter according to preferable embodiment, being not used to limit its execution scope. Any equivalent variations and modifications made according to appended claims are all covered by the claims claimed by the present invention.

Wet curling dependence on various layer parameters can be analyzed as a bi-metallic beam problem known as Timoshenko equation that calculates the beam curvature due to difference in thermal mismatch.

The beam has no curling at temperature $T_0$, when temperature changed to T, the beam got curvature $k_b$:

$$k_b = \frac{6\Delta T \Delta\alpha(1+m^2)}{h\left(3(1+m)^2 + (1+mn)\left(m^2 + \frac{1}{mn}\right)\right)}$$

wherein m is thickness ratio of $t_1/t_2$, n is the elastic modulus ratio $E_1/E_2$, h is the total thickness $t_1+t_2$, $\Delta T$ is the temperature change $T-T_0$, and $\Delta\alpha$ is the thermal coefficient mismatch $\alpha_2-\alpha_1$.

The Timoshenko analytical solution is adapted and used to evaluate dimensional stability of a wallcovering by defining the wet curling value of a composite sheet of a wallcovering when the heat coefficient mismatch—$\Delta T\Delta\alpha$ is replaced by a base layer wet expansion—$\beta$.

$$\Delta T\Delta\alpha \rightarrow \beta$$

So the wet curling value can be obtained by formula:

$$k_b = \frac{6\beta(1+m^2)}{h\left(3(1+m)^2 + (1+mn)\left(m^2 + \frac{1}{mn}\right)\right)}$$

wherein $\beta$ is dimensionless base layer wet expansion in %, m is thickness ratio $t_1/t_2$ of top layer $t_1$ to base layer $t_2$, n is elastic modulus ratio $E_1/E_2$ of the top layer elastic modulus $E_1$ and the bottom layer elastic modulus $E_2$, and h is total $t_1+t_2$ thickness of the top layer $t_1$ and the base layer $t_2$.

It is assumed that the wet curling process occurs at room temperature and 50% relative humidity and there are no other factors significantly influencing the curling except of base layer wet expansion.

Accordingly, the wet curling can be significantly and sufficiently decrease by at least one of the below (or in any combination):

lowering wet expansion of the base layer; and/or
increasing thickness ratio of top layer to base layer; and/or
increasing elastic modulus of the top layer.

Nevertheless some constrains has to be observed and in particular elastic modulus of the top and the base layers, overall thickness of the composition. The constrains on the elastic modulus of the top and base layer are due to thermal shrinkage, while thickness limitation is due to practical reasons—the non-woven base usually cannot be thinner than 100 microns and total wallcovering thickness will rarely be above 1 mm, preferably 0.8 mm due to esthetic and cost reasons.

Figure 1:
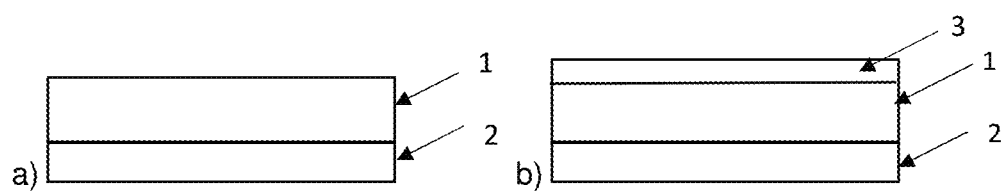
FIG. 1 shows position of layers of a composite sheet: a) two layers composition sheet; b) three layers composition sheet.

Referring to the drawing FIG. 1a, a composite sheet for a wallcovering in accordance with first embodiment of the present invention comprises a top layer (1) and a base layer (2). The top layer (1) comprises a decorative foamable material, for example polyolefin, in foamed state having modulus below 0.1 GPa. The base layer (2) has modulus above 1 GPa and comprises a substrate comprising cellulose and synthetic fibers. The modulus ratio between the top layer (1) and the base layer (2) modulus is 0.05. The wet expansion of the base layer (2) is ≤0.5% and the thickness ration of the top layer (1) to base layer (2) is from 2 to 6 wherein overall thickness of a wallcovering comprising the composition is ≤1 mm and especially ≤0.8 mm.

Stability of a wallcovering comprising the composite sheet as described above could be increased or further increased by increasing the modulus of the top layer (1). But this is not possible in case of polyolefin-only top layer (1) due to curling issues during manufacturing (as described in EP patent application No 14158061.3). In order to increase stability of the wallcovering by increasing elastic modulus of top layer (1) an additional layer (3) that has a high elastic modulus but is free of or almost free of influence on thermal shrinkage is applied on the polyolefin layer (1) during manufacturing of the composition sheet. Referring to the drawing FIG. 1b, a composite sheet for the wallcovering in accordance to another embodiment of the present invention comprises the top layer (1), wherein the top layer (1) comprises polyolefin in foamed state, the base layer (2) and the additional layer (3) comprising polymer. The polyolefin layer (1) has modulus below 0.1 GPa, the base layer (2) has modulus above 1 GPa and comprises a substrate comprising cellulose and synthetic fibers. The additional layer (3) has modulus above 0.1 GPa, preferably above 1 GPa and thickness 5-20 micron. The additional layer (3) can be a polymeric layer, for example water-based acrylic emulsion layer, like printing inks layer. In case of acrylic polymers the modulus is typically above 1 GPa at room temperature when the glass transition temperature of the polymer is above 30, preferable above 40° C. Using additional layer with thickness above 20 micron causes thermal curling while below 5 micron is not significant enough to influence the wet curling. The modulus ratio is 0.05 between the top layer (1) and the base layer (2) modulus. The wet expansion of the base layer (2) is ≤0.5% and the thickness ration of the top layer (1) to bottom layer (2) is from 2 to 6 and overall thickness of a wallcovering comprising the composition is ≤1 mm and especially ≤0.8 mm.

In case of the first and the second embodiments it is preferable that wet expansion of the base layer (2) is less than 0.3% and the thickness ration of the top layer (1) to base layer (2) is from 3 to 6 wherein overall thickness of a wallcovering comprising the composition is ≤1 mm and especially ≤0.8 mm.

An in House Wet Curling Test Method

Testing method which allows measuring wet curling in a repeatable way and predicting behavior of a wallcovering during wet hanging process was developed.

A 12×15 cm size sample with a longer side in the machine direction is cut from a test composite sheet. Backing of the sample is coated with a standard water based glue at room temperature and 50% relative humidity conditions and is immediately hanged holding it at one point. The sample curls and after one minute the distance between top and bottom edges is measured. Wet curl parameter is calculated by subtracting average of the described distance from the width of the sample. The range or parameter is 0-12. In case the sample curls in a roll, the distance is considered zero and the parameter is close to 12 or 12. The preferable wet curl parameter is close to 0 or 0. The higher the value the more difficult it is to hang a wallcovering.

Figure 2:
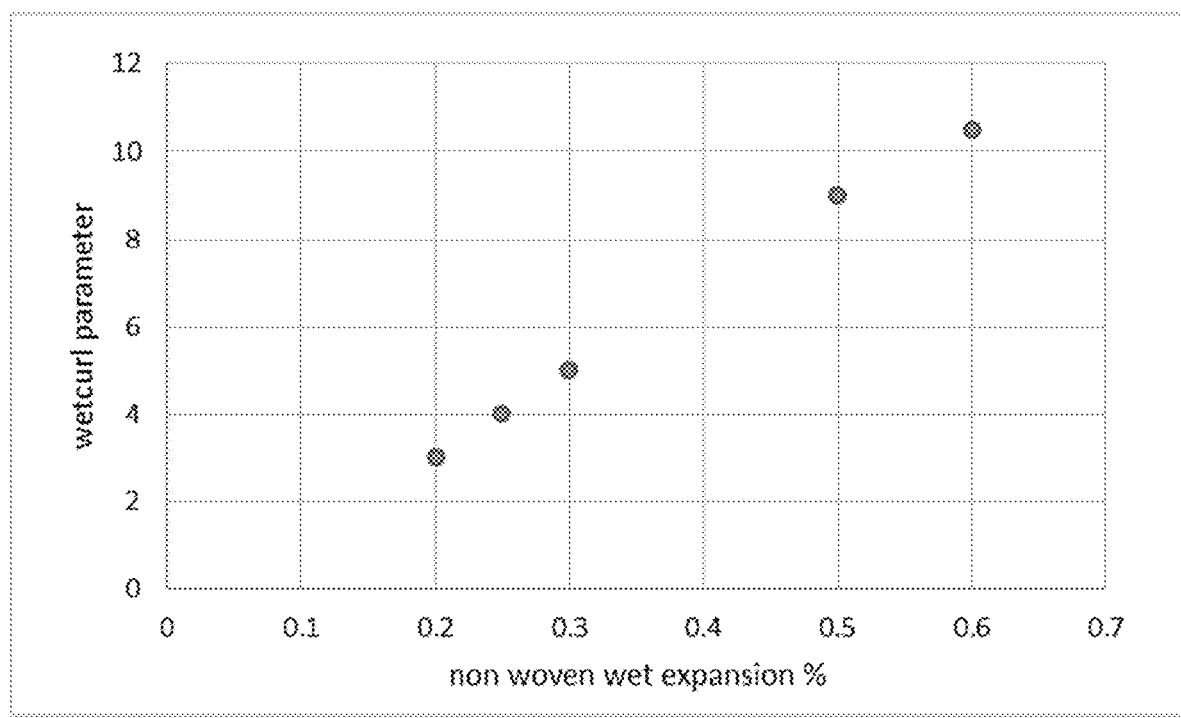
FIG. 2 shows test results of wet curl of composite sheets with similar top layer on non-wovens with different wet expansion (other parameters are constant).
Figure 3:
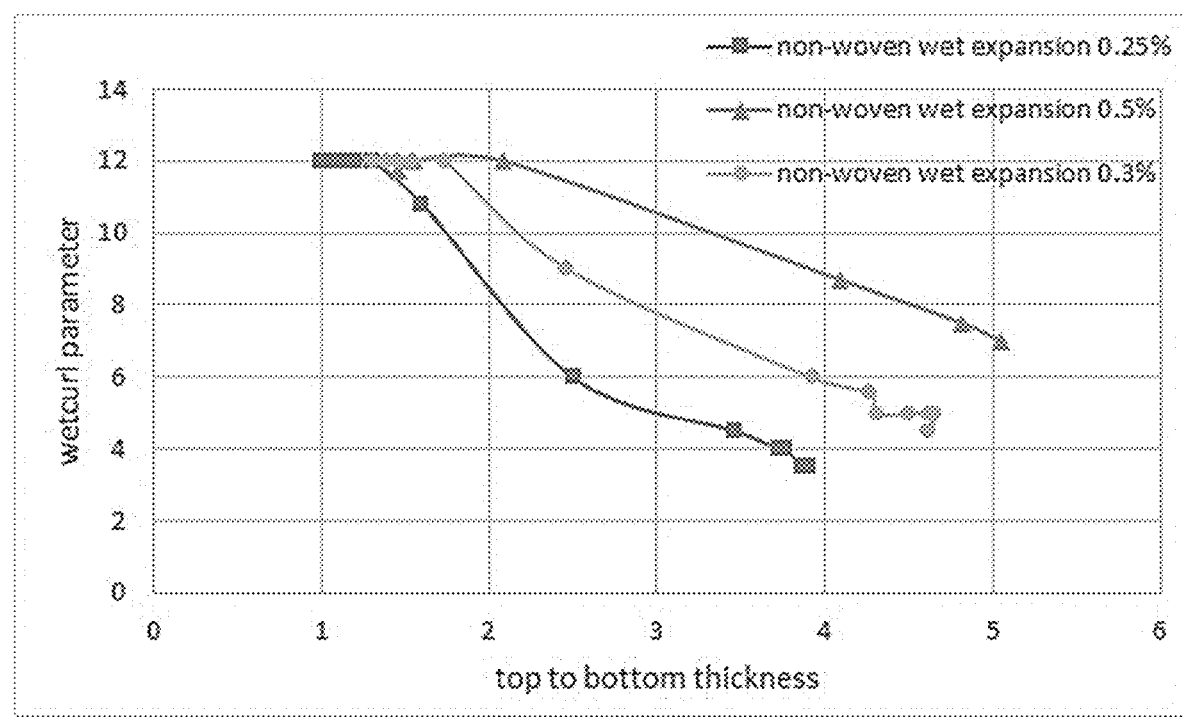
FIG. 3 shows test results of wet curl parameter of different top to bottom layer thickness ratios on various non-wovens (other parameters are constant).
Figure 5:
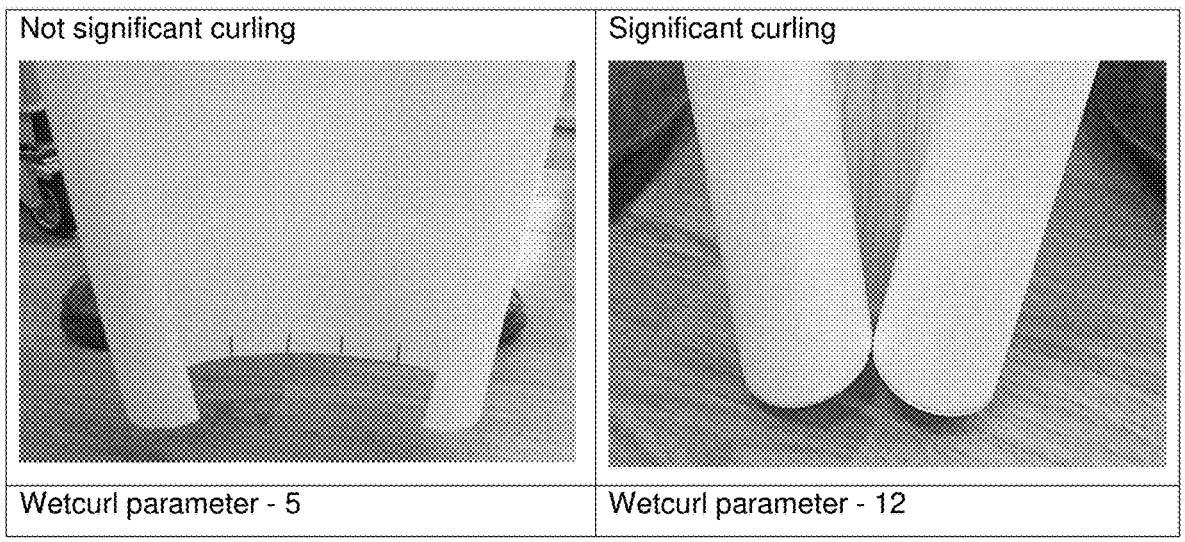
FIG. 5 shows wet curling of a test sample.

Samples of composite sheets with varied parameters of different layers were prepared and their wet curling performance according to the above described testing method was measured. According to performed tests data of FIG. 2-4, the wet curl of composite sheet decreases as the wet expansion of the non-woven decreases. The measurement shows also significant influence of the thickness ratio—i.e. when the top layer (1) to bottom layer (2) is more than 2 the wet curl parameter falls of rapidly. Also the influence of polymer modulus in the additional layer (3) is quite visible—by using polymer with modulus above 0.1 GPa, preferably above 1 GPa the wet curl parameter is decreased by several units.

Tests for hanging wallcoverings having different wet curl parameter $k_b$ showed that wallcoverings with wet curl >7 are troublesome to apply and edges tend to curl on the wall. The best results were obtained with wet curl parameter ≤5.

Examples

According to the first embodiment, the composition sheet comprises the top foamable layer (1) comprising polyolefin, the base layer (2) comprising non-woven material having wet expansion 0.25%, wherein thickness ratio of the top layer (1) to the base layer (2) is from ~2.2 to ~3.9.

According to the first embodiment, the composition sheet comprises the top foamable layer (1) comprising polyolefin, the base layer (2) comprising non-woven material having wet expansion 0.3%, thickness ratio of the top layer (1) to the base layer (2) from ~3.5 to ~4.6.

According to the first embodiment, the composition sheet comprises the top foamable layer (1) comprising polyolefin, the base layer (2) comprising non-woven material having wet expansion 0.5%, thickness ratio of the top layer (1) the base layer (2) ~5.

According to the second embodiment, the composition sheet comprises the top foamable layer (1), wherein the top layer (1) comprises polyolefin, the base layer (2) comprising non-woven material having wet expansion 0.25%, and the additional layer (3) having elastic modulus from 0.2 GPa to 2 GPa.

According to the second embodiment, the composition sheet comprises the top foamable layer (1), wherein the top layer (1) comprises polyolefin, the base layer (2) comprising non-woven material having wet expansion 0.5%, and the additional layer (3) having elastic modulus from 1.2 GPa to 2 GPa.

The term wet expansion is regarded as parameter being calculated as percentage of difference between length of a dry cellulose based specimen and wetted cellulose based specimen in cross-machine direction according to well-known methods of testing. These methods may be based on but not limited to Fenchel, Mütek 4 N, Mütek 1 N, ISO 5635 standards. Theoretically the measurements should provide similar data if performed correctly. The lower the wet expansion the better is dimensional stability of cellulose composite based material. The wet expansion parameter is provided by manufacturer of base for wallcoverings and varies in measuring technique. It should be understood, that wet expansion of a wallcovering layers causing the described complication in hanging process of wallcoverings as described in the background of the invention is observed at a room temperature and at 50% relative humidity.

Although the present description includes numerous characteristics and advantages of the invention together with structural details and features, the description is given as an example of the invention embodiment. There may be changes in the details, especially in the form, size and layout of materials without departing from the principles of the invention, in accordance with the widely understood definition of terms used in claims.

The invention claimed is:

1. A composite sheet for a wallcovering comprising:
   a polyolefin layer made of a foamable layer of polyolefin compound and having an elastic modulus less than 0.1 GPa;
   a base layer having an elastic modulus greater than 1 GPa, comprising a non-woven made of cellulose and synthetic fibers, and having a wet expansion of 0.25% or less; a thickness ratio of the polyolefin layer to the base layer of 3 to 5; and
   an additional polymeric layer located above said polyolefin layer such that the polyolefin layer is disposed between the base layer and the additional polymeric layer, wherein said additional polymeric layer has an elastic modulus greater than 1.2 GPa and a thickness of 5-20 microns;
   wherein the composite sheet has a thickness of 1 mm or less.

2. A wallcovering comprising the composite sheet of claim 1.

* * * * *